United States Patent
Fenchl et al.

(12)

(10) Patent No.: US 6,346,588 B1
(45) Date of Patent: Feb. 12, 2002

(54) TERPOLYMERS BASED ON SULFOBETAINES, PROCESSES FOR THEIR PREPARATION AND THEIR USE AS THICKENERS FOR AQUEOUS SALT SOLUTIONS

(75) Inventors: Andrea Fenchl, Wasserburg; Johann Plank, Trostberg; Michael Schinabeck, Garching, all of (DE)

(73) Assignee: SKW Polymers GmbH, Trostberg (DE)

( * ) Notice: Subject to any disclaimer, the term of this patent is extended or adjusted under 35 U.S.C. 154(b) by 42 days.

(21) Appl. No.: 09/589,053

(22) Filed: Jun. 7, 2000

(30) Foreign Application Priority Data

Jun. 30, 1999 (DE) .......................................... 199 30 031

(51) Int. Cl.$^7$ ...................... C08F 226/06; C08F 220/38; C08F 228/02; C08F 4/04
(52) U.S. Cl. ................... 526/218.1; 526/219.6; 526/263; 526/265; 526/287

(58) Field of Search ........................... 526/218.1, 219.6, 526/263, 265, 287

(56) References Cited

U.S. PATENT DOCUMENTS

| 3,411,912 A | * | 11/1968 | Dykstra |
| 3,497,482 A | * | 2/1970 | Hwa |
| 3,671,502 A | * | 6/1972 | Samour ....................... 526/287 |
| 4,650,848 A | * | 3/1987 | Schulz ........................ 526/287 |

* cited by examiner

*Primary Examiner*—Christopher Henderson
(74) *Attorney, Agent, or Firm*—Fulbright & Jaworski LLP

(57) ABSTRACT

Terpolymers based on (meth)acrylamide, hydroxyalkyl (meth)acrylate and sulfobetaine monomers and their use as thickeners for aqueous salt solutions are described. The terpolymers display their thickening effect within wide concentration and density ranges of the aqueous salt solutions. In addition, their thermal stability is retained also with respect to salt solutions containing calcium chloride and/or calcium bromide and/or zinc bromide.

7 Claims, No Drawings

TERPOLYMERS BASED ON SULFOBETAINES, PROCESSES FOR THEIR PREPARATION AND THEIR USE AS THICKENERS FOR AQUEOUS SALT SOLUTIONS

The present invention relates to terpolymers based on sulfobetaines, processes for their preparation and their use as thickeners for aqueous salt solutions, in particular in the form of highly saline so-called completion and workover brines in the oilfield sector. Completion brines are understood as meaning, for example, aqueous solutions of $CaCl_2$, $CaBr_2$ or $ZnBr_2$ up to saturation and mixtures thereof having a density range of from 1.3 to 2.3 g/ml. It is generally difficult to thicken such brines since conventional thickening agents based on anionic polymers or hydroxyethylcellulose (HEC) no longer have a thickening effect in concentrated salt solutions and moreover are insoluble or only very poorly soluble, so that, for example, the preparation of premixes, heating or high stirring speeds are required.

According to the prior art, mainly HEC has been used to date as a thickener for highly saline completion and workover brines in oilfields, but it is necessary in each case to prepare special mixtures in order to obtain HEC in solution. WO 97/26310 describes premixes of HEC with a prehydrating alcohol, an alcoholic solvent and an inorganic salt, WO 97/13578 describes premixes of HEC with propylene glycols and polyether glycols and U.S. Pat. No. 4,350,601 describes polysaccharides which have been treated with formaldehyde and/or with aliphatic dialdehydes. Their advantage is improved dissolution behavior and hence improved efficiency as thickeners for zinc-containing brines.

However, a disadvantage of these thickeners is that HEC is thermally stable only up to max. 135° C. and does not have a thickening effect in brines having densities of between 1.45 and 1.75 g/ml at room temperature (thickening gap). In addition, it was found that HEC is precipitated from the brines at temperatures as high as above 650C. (cf. R. M. Hodge, SPE Drilling & Completion, June 1998).

Poly(sodium acrylamidomethylpropane)sulfonate, hydrolyzed polyacrylamides and poly(vinypyrrolidone) and copolymers thereof are water-soluble polymers which are described in the literature and are used as thickeners of aqueous solutions. The effect as thickener is based on the combination of high molecular weight and chain extension, which is due to the mutual repulsion of identically charged ionic groups along the polymer chain or to hydrogen bridge bonds. These polymers are however known to be sensitive to the action of salts and their use in highly saline systems is therefore limited.

U.S. Pat. No. 5,480,863 discloses a process for increasing the viscosity of zinc-containing brines (up to 1.8 g/ml) with acrylamide/AMPS copolymer in the presence of a surfactant, and U.S. Pat. No. 4,619,773 discloses a thickened brine stable at high temperature (200° C.) and containing AMPS/vinylamide and optionally acrylamide.

Betaines are a particular type of zwitterions. They neutralize themselves and contain no opposite ions. In addition, the positive and negative charges are separated from one another by alkyl groups. Polymers which contain betaine monomers show antipoly-electrolytic behavior in salt solutions, i.e. they swell up instead of contracting.

Carboxymethacrylate-betaine monomers and polymers are known and are disclosed in U.S. Pat. No. 2,777,872, U.S. Pat. No. 2,834,758 and U.S. Pat. No. 2,846,417. Carboxybetaines are sensitive to divalent ions, such as, for example, calcium. However, calcium salts are the basis of the customary completion brines.

Methacrylate-based sulfobetaine monomers and polymers have already been disclosed in German Auslegeschrift 1,207,630. The reaction solutions obtained in the synthesis examples are already highly viscous at a solids content of only 5% by weight (100,000 to 400,000 cP, Brookfield viscosity). Sulfobetaine copolymers with hydroxyethyl methacrylate (HEMA) are described, for example, by J. M. Rego et al. in Polym. J., 23(12), 1425–34, the polymer being reacted with a crosslinking agent and a hydrogel being obtained, which is optimized with respect to its material properties.

Sulfobetaine copolymers as thickeners for salt solutions are disclosed, for example, in U.S. Pat. Nos. 5,153,289 and 4,650,848. According to U.S. Pat. No. 5,153,289, an N-3(3-sulfopropyl)-N-methacryloyloxyethyl-N, N-dimethylammonium betaine (SPE)/N-vinyl-pyrrolidine (NVP) copolymer is recommended as a thickener in up to 20% strength NaCl solution. U.S. Pat. No. 4,650,848 describes a terpolymer of acrylamide (AM), a hydrophobic acrylamide and a sulfobetaine monomer and its use as a thickener in up to 20% strength NaCl solution. Said sulfobetaine-containing polymers are always obtained as solids.

However, in the thickening of highly saline aqueous systems, the problem of bringing a thickener into solution generally occurs since the water is bound in the solution by the high salt content and is thus no longer available for dissolving the polymer. This often leads to agglomeration and to incomplete dissolution of the thickener. Consequently, the producing rock formations may be blocked and thus damaged. It is therefore often necessary to prepare premixes of the thickeners or to use expensive technical mixing devices (for example with high shear load, high temperature, etc.) in order to increase the viscosity in salt solutions (such as, for example, in the case of HEC).

It was therefore the object of the present invention to develop a terpolymer which can be used as a thickener for highly saline systems, which terpolymer simultaneously

- has a thickening effect over a wide density range (1.2–2.5 g/ml)
- remains stable at high temperatures (up to at least 200° C.) over a period of at least 48 h
- is stable to polyvalent ions (e.g. $Ca^{2+}$, $Zn^{2+}$)
- can be prepared and used without great technical complexity (e.g. with high shear load, high temperature, etc.).

This object was achieved, according to the invention, by the terpolymers according to claim 1.

Surprisingly, it was found that sulfobetaine polymers which contain a monomer having a pendant OH group thicken salt solutions to a substantially greater extent than conventional sulfobetaine polymers.

The terpolymers corresponding to the present invention are composed of three structural units altogether. The first structural unit a) corresponds to the general formula I (I)

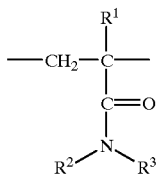

in which $R^1$ denotes H or $CH_3$, $R^2$ and $R^3$, independently of one another, denote H, a $C_{1-4}$-alkyl (linear or branched) or phenyl radical.

The second structural unit b) corresponds to the general formula II (II)

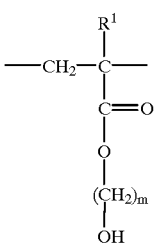

in which $R^1$ represents H or $CH_3$ and m represents 1 to 4

The third structural unit c) finally corresponds to the general formula III (III)

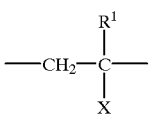

in which X is selected from the group consisting of

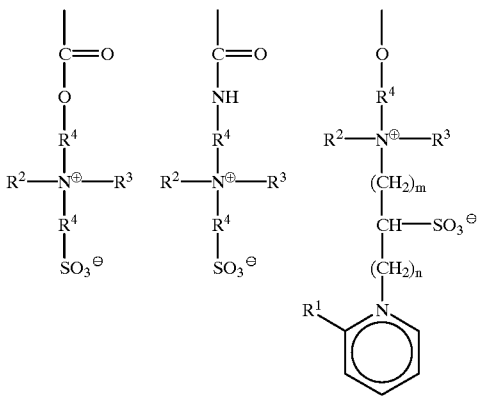

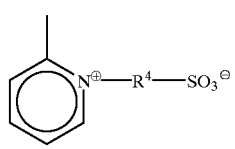

in which $R^4$ denotes —$(CH_2)_m$—,

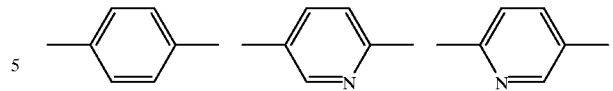

m denotes 1 to 4 and n denotes 0 to 3 and $R^1$, $R^2$ and $R^3$ have the abovementioned meaning.

It is to be regarded as essential to the invention that the terpolymers corresponding to the present invention are composed of from 5 to 79 mol % of the structural unit a), from 20 to 94 mol % of the structural unit b) and from 1 to 75 mol % of the structural unit c).

A particular advantage of the terpolymers according to the invention is that they are thermally stable in aqueous solution up to at least 200° C.

In addition, the synthesis of these sulfobetaine polymers can be controlled so that the aqueous reaction solution formed during their preparation and having a preferred solids content of from 5 to 60% by weight and a preferred viscosity from 50 to 500,000 cP at 20° C. can—if desired and technically expedient—be used without further working up as a liquid thickener for highly saline systems. This is a significant advantage since the full thickening effect can be obtained without special technical equipment or prior treatment of a thickener powder within a very short time.

In the case of all thickeners used to date for highly saline systems, either expensive premixes have to be prepared or additional auxiliary agents have to be added in order to bring the active substances into solution in the respective systems. The efficiency of the respective active substance can be impaired thereby. These problems do not occur when the terpolymers according to the invention are used as a thickener.

The terpolymers according to the invention can be prepared in a technically simple manner by subjecting the (meth)acrylamide, hydroxyalkyl (meth)acrylate and sulfobetaine monomers to a free radical homogeneous polymerization in aqueous solution. According to a preferred embodiment, the preparation of terpolymers comprises the following steps:

Dissolution of the (meth)acrylamide, hydroxyalkyl (meth)acrylate and sulfobetaine monomer in oxygen-free water Initiation of the reaction with a suitable free radical initiator at a suitable temperature Polymerization of the monomers over a suitable period in order to form the polymer Cooling of the reaction mixture to room temperature.

Suitable free radical initiators for free radical copolymerization are, for example, potassium persulfate, sodium thiosulfate, 2,2'-azobis(2amidinopropane) dihydrochloride, benzoyl peroxide, AIBN and other customary free radical initiators. The concentration of free radical initiators is preferably adjusted to 0.01 g to 20 g per 100 g of monomers.

The polymerization of alkylacrylamide, hydroxyalkyl acrylate and sulfobetaine monomer preferably takes place at a temperature between 10 and 100° C. over a preferred period between 20 min and 24 h.

The terpolymers according to the invention are suitable, in particular as powder or in the form of an aqueous optionally salt-containing solution, as thickeners for aqueous salt solutions. However, it is also possible, within the scope of the present invention, for the terpolymers to be formulated as a solution or suspension in organic solvents which are preferably selected from the group consisting of glycol ethers (e.g. triethylene glycol hexyl ether, propylene glycol methyl ether, tripropylene glycol methyl ether, dipropylene glycol methyl ether), glycols (e.g. ethylene glycol, propylene glycol, polyethylene glycols ($M_n$=50–1000 g/mol), polypropylene glycols ($M_n$=50–500 g/mol)), alcohols (preferably having 1 to 6 carbon atoms), alpha-olefins (e.g. mixtures of linear $C_{14-30}$-alpha-olefins), poly-alpha-olefins (e.g. hydrogenated 1-decene dimers), mineral oils, vegetable and animal oils (e.g. palm oil, linseed oil, rapeseed oil, coconut oil, fish oil, tallow), their esters or mixtures thereof. Preferably, the corresponding aqueous or organic solutions or suspensions have a solids content of from 5 to 60% by weight, based on the total weight of the solution or suspension. Based on the aqueous salt solutions, which preferably contain lithium, sodium, potassium, cesium, calcium and zinc salts with inorganic (e.g. fluoride, chloride, bromide, iodide, nitrate, sulfate, phosphate, carbonate, silicate) or organic anions (e.g. formate, acetate, citrate), the terpolymers according to the invention are used in an amount of from 0.01 to 20% by weight.

The particular advantages of the terpolymers according to the invention are that they display their thickening effect also within wide concentration (from 5 to 90% by weight) and density ranges (from 1.30 to 2.50 g/ml) of the aqueous salt solutions and their thermal stability is retained in particular with respect to salt solutions containing calcium chloride and/or calcium bromide and/or zinc bromide.

The following examples are intended to illustrate the invention in more detail.

PREPARATION EXAMPLES

Example A.1

110 ml of water are added to a 1 l reaction flask having a high-efficiency condenser, a KPG stirrer, thermometer and a gas inlet tube, and the flask is flushed with $N_2$ inert gas for one hour. Thereafter, 10 g of N-3(3-sulfopropyl)-N-methacryloyloxyethyl-N, N-dimethylammonium betaine (SPE), 20 g of hydroxyethyl methacrylate (HEMA) and 9.5 g of dimethylacrylamide (DMAA) are dissolved therein and the mixture is heated to 60° C. The reaction is initiated by adding 1 g of 2,2'-azobis(N,N'-dimethyleneisobutyramidine) dihydrochloride. After four hours, the reaction batch is cooled to room temperature. The light pink solution obtained has a solids content of 35% by weight and a Brookfield viscosity (20 rpm, spindle No. 1) of 450 cP at 20° C.

Example A.2

270 ml of water are added to a 1 l reaction flask having a high-efficiency condenser, a KPG stirrer, thermometer and a gas inlet tube, and the flask is flushed with $N_2$ inert gas for one hour. Thereafter, 5 g of N-3(3-sulfopropyl)-N-methacryloyloxyethyl-N,N-dimethylammonium betaine (SPE), 9.8 g of hydroxyethyl methacrylate (HEMA) and 9.3 g of dimethylacrylamide (DMAA) are dissolved therein and the mixture is heated to 50° C. The reaction is initiated by adding 0.2 g of 2,2'-azobis(N,N'-dimethyleneisobutyramidine) dihydrochloride. After four hours, the reaction batch is cooled to room temperature. The light pink solution obtained has a solids content of 8% by weight and a Brookfield viscosity (20 rpm, spindle No. 1) of 750 cP at 20° C.

Example A.3

270 ml of water are added to a 1 l reaction flask having a high-efficiency condenser, a KPG stirrer, thermometer and a gas inlet tube, and the flask is flushed with $N_2$ inert gas for one hour. Thereafter, 5 g of N-3(3-sulfopropyl)-N-methacryloyloxyethyl-N,N-dimethylammonium betaine (SPE), 9.8 g of hydroxyethyl methacrylate (HEMA) and 9.3 g of dimethylacrylamide (DMAA) are dissolved therein and the mixture is heated to 50° C. The reaction is initiated by adding 0.01 g of potassium persulfate. After four hours, the reaction batch is cooled to room temperature. The light pink solution obtained has a solids content of 8% by weight and a Brookfield viscosity (20 rpm, spindle No. 1) of 600 cP at 20° C.

Example A.4

135 ml of water are added to a 1 l reaction flask having a high-efficiency condenser, a KPG stirrer, thermometer and a gas inlet tube, and the flask is flushed with $N_2$ inert gas for one hour. Thereafter, 5.5 g of N-3(3-sulfopropyl)-N-methacryloylamidopropyl-N, N-dimethylammonium betaine (SPP), 9.8 g of hydroxyethyl methacrylate (HEMA) and 9.3 g of dimethylacrylamide (DMAA) are dissolved therein and the mixture is heated to 70° C. The reaction is initiated by adding 0.5 g of 2,2'-azobis(N, N'-dimethyleneisobutyramidine) dihydrochloride. After four hours, the reaction batch is cooled to room temperature. The light pink solution obtained has a solids content of 14.5% by weight and a Brookfield viscosity (20 rpm, spindle No. 1) of 450 cP at 20° C.

Example A.5

135 ml of water are added to a 1 l reaction flask having a high-efficiency condenser, a KPG stirrer, thermometer and a gas inlet tube, and the flask is flushed with $N_2$ inert gas for one hour. Thereafter, 5 g of N-3(3-sulfopropyl)-N-methacryloyloxyethyl-N,N-dimethylammonium betaine (SPE), 9.8 g of hydroxyethyl methacrylate (HEMA) and 6.5 g of acrylamide (AM) are dissolved therein and the mixture is heated to 70° C. The reaction is initiated by adding 0.2 g of 2,2'-azobis (N,N'-dimethyleneisobutyramidine) dihydrochloride. After four hours, the reaction batch is cooled to room temperature. The light pink solution obtained has a solids content of 15.3% by weight and a Brookfield viscosity (20 rpm, spindle No. 1) of 280 cP at 20° C.

Use Examples

The viscosities of the salt solutions were determined using a Fann rheometer, model 35SA, from Baroid Testing Equipment at room temperature and at speeds of 600-300- 300-100-6-3 $min^{-1}$.

Use Example B.1
Effect of sulfobetaine terpolymers in $CaCl_2/CaBr_2$ brine

The sulfobetaine terpolymers according to the invention are added to the prepared brines having a defined density and salt content as a 15% by weight reaction solution and develop their full efficiency after being stirred for only a short time at room temperature. The thickened salt solutions are filled into steel cells and statically aged for 16 hours at 180° C. under 250 psi pressure. The salt solutions which contain the sulfobetaine terpolymers according to the invention are homogeneous, viscous mixtures.

The following table is intended to illustrate the thickening effect of various polymers according to Preparation Examples A.1 to A.5.

TABLE 1

Sulfobetaine terpolymer according to Preparation Examples A.1 to A.5 in $CaCl_2/CaBr_2$ solutions having a density of 1.81 g/ml. Dose: 0.5% by weight of polymer

|  | Fann rheology before aging | Fann rheology after aging (180° C., 16 h) |
|---|---|---|
| Preparation Example A.1 | 143-86-54-27-3-2 | 165-99-75-43-10-7 |
| Preparation Example A.2 | 149-79-55-29-3-2 | 170-103-76-46-10-7 |
| Preparation Example A.3 | 148-79-53-29-3-2 | 169-104-76-46-10-7 |
| Preparation Example A.4 | 155-83-58-33-5-2 | 178-111-78-49-9-7 |
| Preparation Example A.5 | 156-82-56-30-3-2 | 155-80-69-26-7-3 |

The high values of the Fann rheology measurements show the good thickening effect of the terpolymers according to the invention.

Use Example B. 2
Effect of pulverulent sulfobetaine terpolymers in $CaCl_2/CaBr_2$ brines The sulfobetaine terpolymers according to the invention are initially introduced as powder into water and weighted with solid salts. Dose: 0.5% by weight

TABLE 2

| Preparation Example | Composition of the salt solution | Fann rheology before aging | Fann rheology after aging |
|---|---|---|---|
| A.1 | 125 g of water<br>3 g of polymer<br>138 g of $CaBr_2$<br>322 g of $ZnBr_2$ | >300-173-124-69-7-3 | 150-78-50-27-7-2 |
| A.1 | 134 g of water<br>2.3 g of polymer<br>75 g of $CaCl_2$<br>237 g of $CaBr_2$ | 224-204-142-76-16-8 | >300-204-142-76-16-8 |

Use Example B. 3
Effect of sulfobetaine terpolymers in $CaCl_2/CaBr_2$ brines of different densities The terpolymers according to the invention also have a thickening effect in salt solutions having a lower density. The sulfobetaine terpolymers according to the invention are added to the prepared brines having a defined density and a salt content as a 15% by weight reaction solution and develop their full efficiency after being stirred for only a short time at room temperature.

TABLE 3

Sulfobetaine terpolymer from Preparation Example A.1 in $CaCl_2/CaBr_2$ solutions having different densities. Dose: 0.5% by weight of polymer

| Density of the salt solution [g/ml] | Fann rheology before aging | Fann rheology after aging |
|---|---|---|
| 1.48 | 43-25-19-13-6-2 | 77-53-44-32-13-6 |
| 1.65 | 69-36-25-13-2-1 | 95-61-47-32-9-6 |
| 1.81 | 149-79-55-29-3-2 | 170-103-76-46-10-7 |

Use Example B.4
Comparison with thickeners according to the prior art

The thickening effect of Cellolize® HEC 10 from Union Carbide, as a typical member of the polysaccharides, and AM/AMPS copolymer according to U.S. Pat. No. 5,480,863, as a typical member of the polyelectrolytes, was investigated.

HEC 10 and the AM/AMPS copolymer were each added as solids to the prepared brines having a defined density and salt content and stirred for one hour at room temperature with a magnetic stirrer. Brines which contain HEC 10 are slightly turbid. The AM/AMPS copolymer does not dissolve completely. Owing to the incomplete solubility at room temperature, both thickeners have not yet reached their full efficiency.

The HEC 10 decomposed on aging for 16 hours at 180° C. under 250 psi pressure, and the salt solutions were converted into low-viscosity, black, foul-smelling mixtures.

The polyelectrolyte comprising AM/AMPS copolymer was deposited on the surface and formed a solid, rubber-like layer. The salt solution itself had a low viscosity.

Tables 4 and 5 exhibit the measured rheological data of HEC 10 and the AM/AMPS copolymer before and after aging at 180° C.

TABLE 4

AM/AMPS copolymers in $CaCl_2/CaBr_2$ solutions. Dose: 0.5% by weight of polymer

| Density of the salt solution [g/ml] | Fann rheology before aging | Fann rheology after aging |
|---|---|---|
| 1.48 | 22-12-13-4-1-1 | 23-13-8-4-1-0 |
| 1.65 | 41-20-14-7-1-1 | 48-25-17-11-2-1 |
| 1.81 | 87-42-28-14-2-1 | 50-26-18-10-1-0 |

TABLE 5

HEC 10 in $CaCl_2/CaBr_2$ solutions. Dose: 0.5% by weight of polymer

| Density of the salt solution [g/ml] | Fann rheology before aging | Fann rheology after aging |
|---|---|---|
| 1.48 | 60-37-28-18-1-1 | 23-12-8-4-1-1 |
| 1.65 | 47-26-19-12-2-1 | 46-26-19-12-2-1 |
| 1.81 | 77-39-26-13-1-1 | 53-27-19-10-1-0 |

What is claimed is:

1. A terpolymer based on sulfobetaines, which is composed of a) from 5 to 79 mol % of structural units of the general formula I

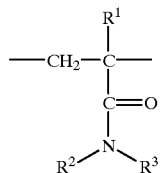
(I)

in which $R^1$ denotes H or $CH_3$ and $R^2$ and $R^3$, independently of one another, denote H, a $C_{1-4}$-alkyl or phenyl radical, b) from 20 to 94 mol % of structural units of the general formula II

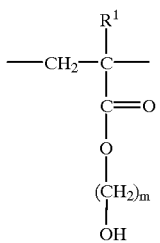
(II)

in which $R^1$ represents H or $CH_3$ and m represents 1 to 4, and c) from 1 to 75 mol % of structural units of the general formula III

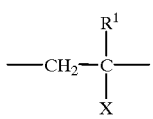
(III)

in which X is selected from the group consisting of

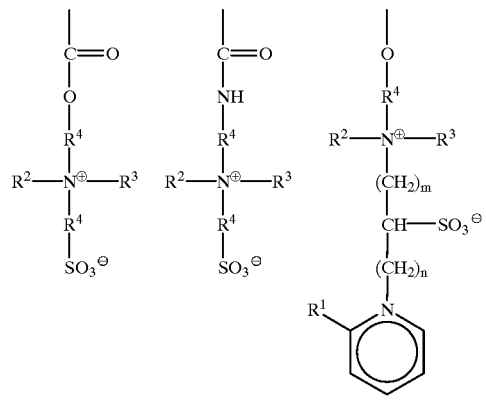

in which $R^4$ denotes $—(CH_2)_m—$,

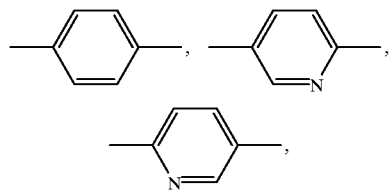

m denotes 1 to 4 and
n denotes 0 to 3 and $R^1$, $R^2$ and $R^3$ have the above-mentioned meaning.

2. The terpolymer as claimed in claim 1, which is present in the form of an aqueous solution having a solids content of from 5 to 60% by weight.

3. The terpolymer as claimed in claim 2, wherein the aqueous solutions have a Brookfield viscosity of from 50 to 500,000 cP at 20° C.

4. The terpolymer as claimed in claim 1 which is thermally stable in aqueous solution up to at least 200° C.

5. A process for the preparation of the terpolymers as claimed in any of claim 1, wherein the (meth)acrylamide, hydroxyalkyl (meth)acrylate and sulfobetaine monomers are subjected to a free radical homogeneous polymerization in aqueous solution at a temperature of from 10 to 100° C.

6. The process as claimed in claim 5, wherein the polymerization is carried out in the presence of free radical initiators selected from the group consisting of potassium persulfate, sodium thiosulfate, 2,2'-azobis(2-amidinopropane) dihydrochloride benzoyl peroxide and AIBN.

7. The process as claimed in claim 6, wherein the concentration of the free radical initiators is adjusted to 0.01 to 20 g per 100 g of monomers.

* * * * *